May 28, 1935.  S. PRZYBOROWSKI  2,002,795

IMMERSING MACHINE

Filed Aug. 31, 1932   4 Sheets-Sheet 1

INVENTOR.
Stanislaus Przyborowski
BY Albert R Henry
ATTORNEYS.

May 28, 1935.  S. PRZYBOROWSKI  2,002,795
IMMERSING MACHINE
Filed Aug. 31, 1932  4 Sheets-Sheet 2
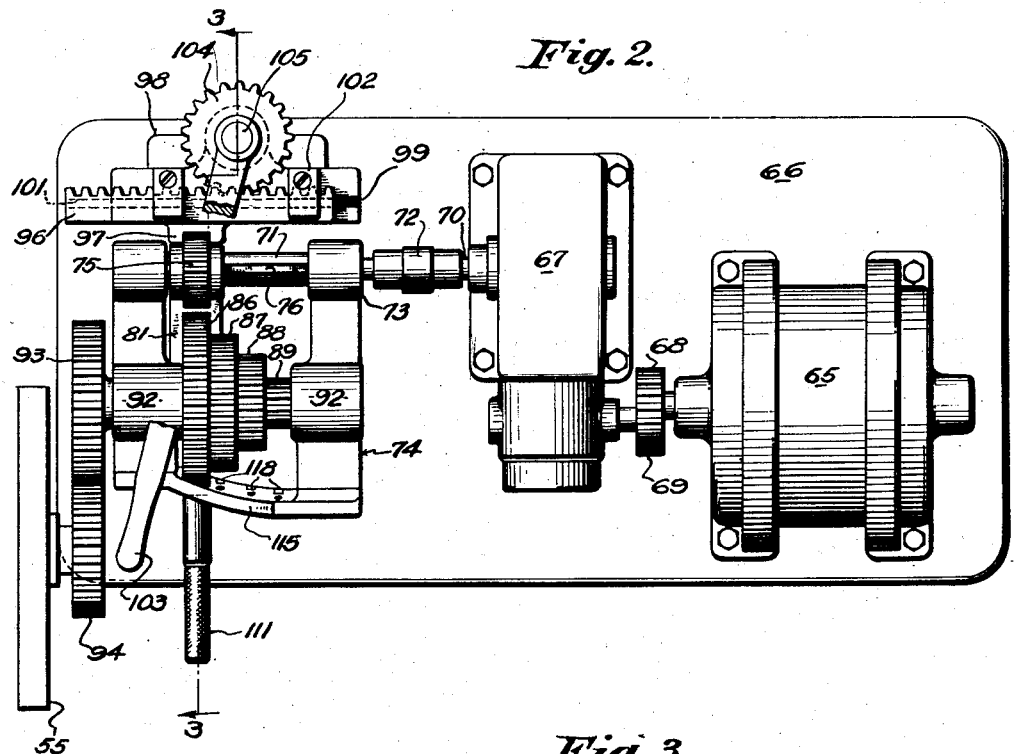
INVENTOR.
Stanislaus Przyborowski
BY Albert R. Henry
ATTORNEYS.

May 28, 1935.  S. PRZYBOROWSKI  2,002,795
IMMERSING MACHINE
Filed Aug. 31, 1932  4 Sheets-Sheet 3

INVENTOR.
Stanislaus Przyborowski
BY
ATTORNEYS.

May 28, 1935.  S. PRZYBOROWSKI  2,002,795
IMMERSING MACHINE
Filed Aug. 31, 1932　　4 Sheets-Sheet 4
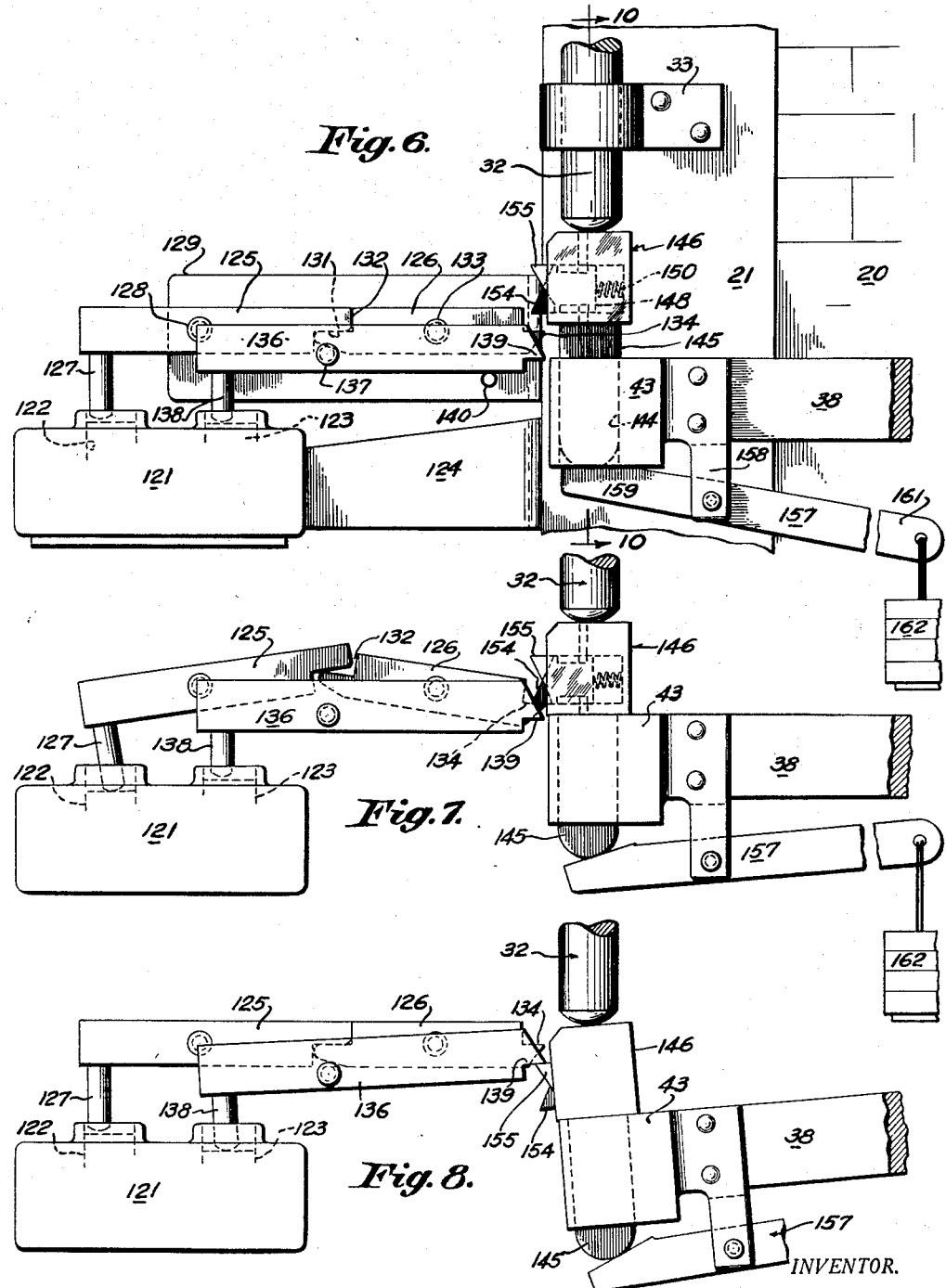
INVENTOR.
Stanislaus Przyborowski
BY Albert R. Henry
ATTORNEYS.

Patented May 28, 1935

2,002,795

UNITED STATES PATENT OFFICE 2,002,795

IMMERSING MACHINE

Stanislaus Przyborowski, Buffalo, N. Y., assignor to Fedders Manufacturing Company, Inc., Buffalo, N. Y.

Application August 31, 1932, Serial No. 631,221

7 Claims. (Cl. 91—12.5)

This invention relates to an immersing machine, and it has particular reference to apparatus for effecting the immersion in a treating bath of assembled parts for a predetermined time.

The invention, while susceptible of various other applications, will be explained herein in connection with the dipping of radiator cores in a solder bath. In such devices, a plurality of deformed members are clamped together to form the water and air passages of the usual cellular radiator. Subsequent to this assembly it is necessary to solder the ends of the tubes to complete the radiator core, the solder in such cases sealing the water passages and also providing a bonding material between the various sections.

Prior to the present invention, it was customary to submerge the face portions of the core, following which, after an indefinite or variable interval of time, the core was manually removed from the solder bath. The duration of immersion, which was determined by the operator, induced a human factor in the production of cores and was necessarily objectional, since carelessness of the operator under fatigue or under pressure of piece work production resulted in improper dipping of the cores.

The present invention comprehends a machine which may be utilized for automatically dipping radiator cores for a predetermined interval of time, and it is adjustable through a range of various time intervals to take care of radiators of different types. The machine also is adjustable for regulating the depth of the dip and the speed of operation of the elevator mechanism, and it incorporates other various novel features hereinafter described in conjunction with the accompanying drawings, wherein:

Fig. 2 is a plan of the drive mechanism on a somewhat larger scale.

Fig. 3 is a section on the line 3—3 of Fig. 2.

Fig. 6 is an enlarged view of the control switch mechanism in a position prior to the placing of a core on the machine.

Fig. 7 is a view of the control mechanism immediately after the placing of a core on the machine.

Fig. 8 shows the position of the control mechanism on the upward stroke of the elevating mechanism.

Figure 1:
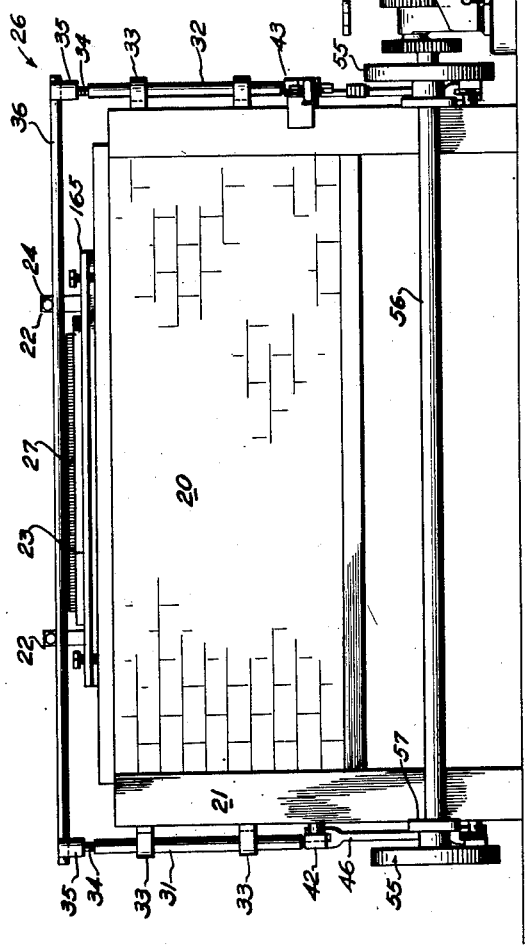
Fig. 1 is a front elevation of the dipping machine and drive mechanism therefor.
Figure 4:
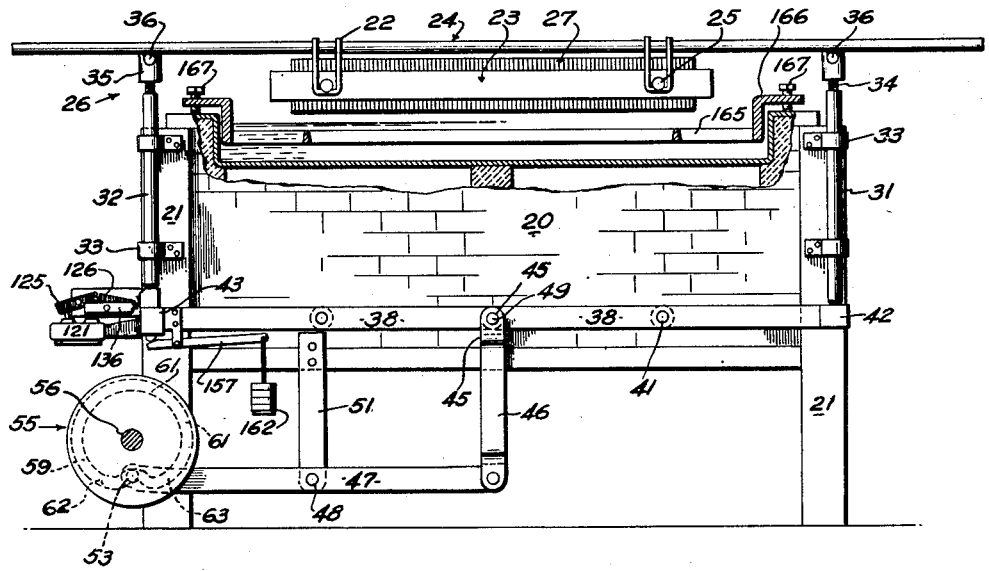
Fig. 4 is an end view of the machine, showing the position of the lever mechanism immediately after a core has been placed thereon.
Figure 5:
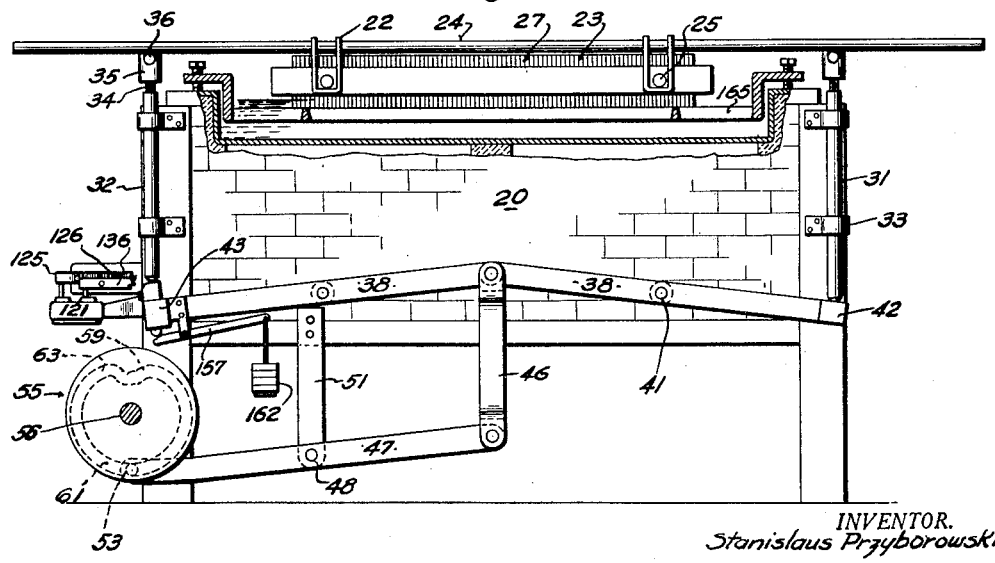
Fig. 5 is similar to Fig. 4 with the exception that the core is shown lowered into the dipping tank.

The machine, which is associated with a tank 20 containing solder or other material as an immersion bath, is adapted to receive a work carrying frame 23, which is conveyed to or from the apparatus by means of carrying bars 24. These members, as shown in Figs. 1, 4, and 5, are provided with depending loops 22 engaging bolts or other protuberances 25 secured to the clamping frame 23, which encloses the work to be treated, such as an assembled radiator core 27.

A receiving frame, generally designated by the numeral 26, is disposed above and at each side of the tank 20, to receive the core 27 and its associated parts. This frame includes vertically mounted bars at each corner of the tank 20, three of which are similar and are indicated by the numeral 31, and the fourth of which is somewhat shorter, and is indicated by the numeral 32. These bars are mounted for sliding movement in bearings 33 which are secured to the supporting legs 21 of the tank 20 and the upper end of each bar is tapped to receive an adjusting screw 34 provided with a slotted head portion 35. Supporting rods 36 are mounted between each pair of screws 34 in the slots 35 thereof, and they are adapted to receive transversely the carrying bars 24 as shown in Figs. 1, 4, and 5. It will be obvious that the level of the bars 36 and the accompanying core may be adjusted by manipulating the screws 34.

Figure 9:
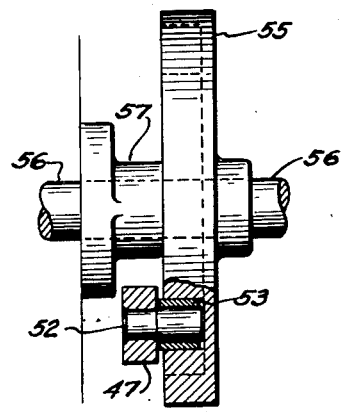
Fig. 9 is a detail of a cam member and related parts.

Supporting means are provided for simultaneously elevating or lowering the bars 31 and 32, comprising a pair of levers 38 mounted on each side of the tank 20 by means of pivot studs 41. The outer end of each lever 38, adjacent the bars 31, is provided with an enlarged member 42, while the similar end of the lever adjacent the bar 32 is provided with a bracket member 43 hereinafter more fully described. The adjacent ends of the levers 38 are connected to each other and to a clevis portion 45 of a connecting link 46 by means of a fulcrum pin 49. The lower end of the link 46 is in turn connected to the end of a drive lever 47 which is pivoted at its central portion by means of a stud 48 secured in a depending bracket 51 mounted on the tank 20. The opposite extremity of the lever 47 carries a stud 52 upon which is rotatably mounted a cam roller 53 (Figs. 4 and 9). Linear motion imparted to the cam roller 53 will result in a corresponding movement in the link 46, levers 38, and finally in the raising or lowering movement in the bars 31 and 32, thereby effecting the removal from or immersion in the treating bath of the work being processed.

The levers 47 are each actuated by similar cam members 55 which are connected to a common driven shaft 56, mounted on the legs 21 of the tank 20 by means of bearing members 57. Each of the cam members 55 contains a cam groove 59 adapted to receive the cam roller 53 and it is shaped with a radial dwell portion 61 (Figs. 4 and 9) and raising and lowering cam portions 62 and 63.

The shaft 56 and accompanying cams 55 are operated by a drive mechanism including a constant speed electric motor 65 mounted on a base plate 66 adjacent the tank structure. Referring to Fig. 2, the motor 65 drives a reducing gear unit 67 through spur gears 68 and 69, and the driven shaft 70 of the unit 67 is connected to a pinion shaft 71 by means of a coupling 72. The shaft 71 is rotatably mounted in the spaced bearings 73 of a bearing pedestal 74 and it slidably receives a pinion 75 which is connected thereto by means of a key 76.

The pinion shaft 71 also carries a bifurcated yoke 81 which straddles the pinion 75 and which serves as a mounting means for an idler gear 82 and a connection gear 83, mounted thereon by pins 84. The connection gear 83, being driven by the pinion 75 through the idler gear 82, at the selection of the operator, is connectible to any one of a plurality of change gears 86, 87, 88, and 89, all of which are keyed to a common shaft 91 journaled in bearings 92 formed on the pedestal 74. The shaft 91 protrudes beyond the left hand bearing 92 and receives a gear 93 which drives a gear 94 secured to the cam shaft 56.

Means are provided for shifting the yoke 81 and accompanying gears to a position opposite any one of the change gears to obtain speed reduction, and means are also provided for locking the yoke in such desired position. The shifting means comprises a rack 96 provided with a yoke portion 97 adapted to engage opposite faces of the pinion 75. This member is mounted on a bracket 98 secured to the base 66 and it is formed with a horizontal groove 99 which receives a cooperating key portion 101 formed in the rack 96 (Fig. 3). A pair of strap members 102, secured to the bracket 98, contact the top surface of the rack to prevent upward movement of the same. The rack is reciprocated by means of a shifting lever 103 which operates a gear 104 through a shaft 105, mounted in a bearing 106 of the bracket 98 and retained against displacement by means of a collar 107. Movement of the handle 103 will result in the rotation of the gear 104 which will cause a horizontal movement of the rack 96 and accompanying pinion 75.

The locking means for the yoke 81 consists of a boss 109 counter-bored to receive slidably a detent pin 110, one end of which protrudes beyond the boss for entrance in locating holes, hereinafter described, while the other end protrudes in the opposite direction and is secured to a handle 111. The detent pin 110 is formed with an enlarged flange 112 which is engaged by a spring 113 mounted within the boss 109 and which urges the pin inwardly.

The bearing pedestal 74 is formed with a web portion 115 which is machined to cooperate with the detent pin 110. This portion is formed with a cylindrical face 116 which contains four spaced and properly located holes 117 for receiving the detent pin 110 in such a position that, in each case, the meshing of the connection gear 83 with one of the gears 86, 87, 88, and 89 is assured. The lower edge of the web 115 is formed with a plurality of guide notches 118, each of which is located immediately beneath a hole 117, and is adapted to receive a tooth portion 119 formed in the yoke 81. It will be noted that the pin 110 serves to carry the radial thrust load imparted on the yoke 81 while the tooth portion 119, located in one of the notches 118, serves as a steadying influence on the yoke and in addition facilitates locating the yoke in proper position opposite one of the holes 117.

The mechanism, as thus far described, may be found adequate in cases where the operators are in constant attendance at the solder tank, inasmuch as the frames and their supporting members may be reciprocated to immerse the core for a definite time interval. However, it has been found desirable to free the operators from the necessity of watching the core at it emerges from the bath, so that they may make themselves useful in this interval for performing other operations.

Accordingly, the present invention further provides a control mechanism which is actuated to start the electric motor 65 when a core is placed in the frame, and which is also operable to stop the motor and accompanying gear train and cams when the core emerges from the bath.

The motor control mechanism, as more specifically shown in Figs. 6, 7, and 8, includes an electric switch unit 121 mounted on a bracket 124 secured to a leg 21 of the tank 20. The starting button 122 thereof is operable through a pair of levers 125 and 126, the former of which is provided at one extremity with a button engaging pin 127, and is mounted on a pivot stud 128 which is secured to a lever bracket 129 positioned on the leg 21. The opposite extremity of the lever 125 is formed with a notch 131 engaging a cooperating notch 132 in the adjoining extremity of the lever 126. The lever 126 is also pivoted to the bracket 129 by means of a stud 133 and its inner extremity is formed with an inwardly inclined tooth 134 which, when depressed as hereinafter described, rotates the lever 126 in a clockwise direction and in turn rotates the lever 125 in the opposite direction so that the pin 127 operates the starting button 122.

A lever 136 is provided to operate the stop button 123 of the switch unit, and it is pivoted at its central portion by means of a stud 137 secured to the bracket 129, and it also contains a pin 138 for operating the stop button. The opposite extremity of the lever 136 is formed with an outwardly inclined tooth 139 and this end of the lever is positioned against downward movement by a stop pin 140 secured to the bracket 129.

Figure 10:
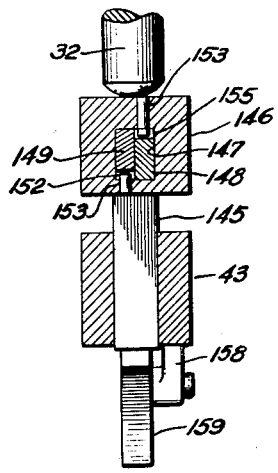
Fig. 10 is a section on the line 10—10 of Fig. 6.

Means for actuating the switch 121 through the medium of the levers 125, 126, and 136, are slidably mounted in a bearing 144 formed in the bracket 43, which is disposed at the end of the lever 38 adjacent the short bar 32. A headed starting member 146, which is mounted in the bearing 144 by means of a depending square shank portion 145, is formed with a socket 147 (see also Fig. 10), in which are slidably mounted starting and stopping fingers 149 and 148 respectively. Each finger is formed with a slot 152 adapted to receive a pin 153 secured in the head 146, and each is normally pressed outwardly, to its limit of travel as determined by the pin and groove connection, by a spring 150 disposed within the socket 147. The starting finger 149 is formed with an outwardly tapered edge 154 terminating in a lower projecting face, while the stopping lever 148 is formed with an oppositely inclined tapered face 155, so that during the reciprocatory movement of the head 146, first one and then the other of the fingers is caused to operate the starting and stopping levers 126 and 136.

The shorter bar 32 of the frame is directly supported on the member 146, and, when a core is not present on the frame the bar 32, member 146, and the adjoining portion of the frame are maintained in a slightly elevated position by means of a counterbalance device, herein shown as lever 157. This lever is so pivoted on an extension 158, formed on the guide bracket 43, that one extremity 159 engages the shank 145 to retain the headed portion 146 thereof in an elevated position as shown in Fig. 6, through the influence of a weight 162 secured to its opposite extremity 161. However, when a core is placed on the frame, its weight is sufficient to counterbalance the elevating effect of the weight 162 and thereby lower the corner of the frame until the head of the member 146 engages the top surface of the guide bracket 43.

A spider may be positioned in or over the bath in the tank 20 for regulating more accurately the depth to which the core 27 may be dipped. This member consists of a grate-like body 165 having flange portions 166 extending over opposite sides of the tank structure and supported at each corner by an adjusting screw 167. The adjusting screws 167 may be manipulated to vary the depth to which the spider is immersed and to adjust it with variations in the level of the molten solder.

The machine, as above described, is capable of a number of settings to vary the time interval in which the core face is immersed in the molten solder, the drawings herein illustrating the highest ratio connection, that is, the shiftable yoke 81 is positioned to couple the pinion 75 with the largest change gear 86.

When it is desired to decrease the immersion interval, the detent pin 110 is withdrawn from the hole 117 opposite the gear 86, and the yoke is thus disengaged from its support and is dropped to disengage the connection gear 83 from the large gear 86. The shifting lever 103 is then operated to move the yoke 81 to the right to align the gear 83 with a smaller change gear, whereupon the yoke 81 is lifted to engage the gear 83 with the desired change gear and it is locked in this position by the detent pin 110.

Subsequent to setting the gear train to the desired ratio, the carrying bars 24 are coupled to a core 27 and are positioned on the transverse supporting rods 36 of the frame, the added weight of this assembly to the frame forcing the bar 32 downwardly to depress the starting member 146 from the position shown in Fig. 6 against the action of the loaded lever 157. During the downward movement of the member 146, the starting finger 154 thereof engages the tooth 134 of the starting lever 126 to actuate the lever 125, causing the pin 127 thereof to depress the starting button 122 of the switch unit 121. The motor 65, thus rendered operative, drives the cams 55 in a clockwise direction through the gear train hereinbefore described, and the cam roller 53 is engaged by the lowering surface 63 of the cam to actuate the lever 47. This results in an upward movement of the link 46 and a corresponding downward movement of the outer ends of the levers 38 upon which the frame bars 31 and 32 are mounted, and, as a result of this action, the core face is submerged and is retained in such position until the cams complete their cycle.

It will be noted that during the downward movement of the member 146, the stop lever 136 is not affected, since the stop finger 148, upon engaging the angular surface 139 thereof, is driven into its slot against the action of its loading spring 150. The starting levers 125, 126 after being moved to a position as shown in Fig. 7 to depress the button 122, are subsequently disengaged from the starting finger 154 by continued downward movement, whereupon the levers 125 and 126 are not further affected.

At the close of the cam cycle the cam roller 53 enters the raising portion 62 of the cam 55, whereupon the lever system 38, 46 and 47 is restored to the position shown in Fig. 4. During this raising movement (Fig. 8) the stop finger 155 of the member 146 engages the tooth 139 of the lever 136, which is moved counterclockwise so that its pin 138 operates the stop button 123 of the switch unit 121, to open the motor circuit.

The operating fingers and levers thus reach the relative positions shown in Fig. 8, from which it will be observed that, since the stop button 123 of the switch 121 is depressed, no further motion through the motor 65 can occur, nor can the starting button 122 be automatically operated, since the starting finger 154 is below its normal actuating position. The machine is thus brought to a stop after the core has been immersed for the proper time, and it is locked in such stopped position as long as the core remains on the machine. When, however, the core is removed from the frame, the weight imposed on the bar 32 is released, and the counterweight 162 becomes effective to push the shank 145 and the member 146 upwardly, the lever 136 being additionally moved to an extent sufficient to permit the finger 148 to slide past its end. The parts are thus restored to the position shown in Fig. 6, and the apparatus, upon reception of a new core, is caused again to travel through the operating cycle just described.

From the foregoing description, it will be apparent that the invention provides apparatus for immersing assembled parts of industrial appliances, which are to be secured together, and that provision is made for effecting such immersion through a range of constant time cycles, so that each article treated may receive the same character and time of treatment. It will also be noted that means are provided for rendering the operation of the machine more or less automatic, so that the desired operations may be effected with a minimum of loss entailed through labor required or reliance upon personal errors in the workmen. While the invention has been described with particular reference to an immersion machine useful in industrial operations, and in which the work to be treated is conveyed to the apparatus in a frame provided with carrying bars, it will be understood that the invention may be applied to other uses and in other fields, and that, within the principles herein set forth and hereinafter claimed, the invention is susceptible of numerous modifications and embodiments, as may readily suggest themselves to those skilled in the art.

I claim:

1. A dipping machine comprising a tank containing a treating bath, a frame adapted to receive an article to be treated in position over said tank, movable supporting means for said frame, reciprocating drive means for said supporting means for alternately lowering and raising said supporting means and accompanying frame and article relative to said tank, starting means for said drive means, and means responsive to the weight of an article placed upon said frame for operating said starting means.

2. A dipping machine comprising a tank containing a treating bath, a frame adapted to receive an article to be treated in position over said tank, movable supporting means for said frame, reciprocating drive means for alternately lowering and raising said supporting means and accompanying frame and article relative to said tank, control means for said drive means, starting and stopping means for said drive means, instrumentalities on said supporting means for operating said starting means, means responsive to the weight of an article placed upon said frame for actuating said instrumentalities, and further instrumentalities on said supporting means for actuating said stop means during upward movement of said supporting means.

3. A dipping machine comprising a tank containing a treating bath, a frame adapted to receive an article to be treated in position over said tank, supporting means for said frame, said means having a depressible member engaged by a portion of said frame, counter-balancing means for retaining said depressible member and said portion of the frame in an elevated position, said depressible member being movable against said counter-balancing means when an article is placed on said frame, reciprocating drive means for said supporting means for alternately lowering and raising said supporting means and accompanying frame and article relative to said tank, starting means for said drive means, means on said depressible member for actuating said starting means upon movement thereof, stop means for said drive means, and means on said supporting means for actuating said stop means during upward movement thereof.

4. An immersion machine comprising a tank formed with a receptacle adapted to contain a treating bath, a depressible frame mounted for sliding movement adjacent the tank, power driven means for operating the frame to approach and recede from the receptacle in a predetermined time cycle, and means responsive to the weight of an article placed on the frame for actuating said power driven means.

5. An immersion machine comprising a tank formed with a receptacle adapted to contain a treating bath, a depressible frame mounted for sliding movement adjacent the tank, power driven means for operating the frame to approach and recede from the receptacle in a predetermined time cycle, means responsive to the weight of an article placed on said frame for actuating said power driven means, and means locking said actuating means in inoperative position on the completion of the cycle.

6. A dipping machine comprising a tank containing molten solder, a frame mounted for vertical movement over the tank and adapted for the placement of radiators thereon, power driven means for operating the frame to approach and recede from the tank in a predetermined time cycle, whereupon a portion of the radiator may be immersed for a definite period of time, and means for adjusting the position of the frame relative to the solder level in the tank whereby the period of immersion of the entrant portion of the radiator may be varied in small increments without altering the time cycle of the drive means.

7. A dipping machine comprising a tank containing molten solder, a supporting grid in said tank below the solder level, a frame mounted for vertical movement over the tank and adapted for the placement of a radiator thereon, power driven means for operating the frame to approach and recede from the tank in a predetermined time cycle, said frame during downward movement depositing the radiator on said grid and continuing its downward movement before being carried upward to remove the radiator from the grid, and means for adjusting the position of the frame relative to the grid whereby the downward movement of the frame after the deposit of the radiator on the grid may be varied.

STANISLAUS PRZYBOROWSKI.